United States Patent
Bai et al.

(10) Patent No.: US 12,328,796 B2
(45) Date of Patent: Jun. 10, 2025

(54) QUASI CO-LOCATION SOURCE REFERENCE SIGNAL CAPABILITY FOR TRANSMISSION CONFIGURATION INDICATION STATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/643,688

(22) Filed: Dec. 10, 2021

(65) Prior Publication Data

US 2022/0322072 A1    Oct. 6, 2022

Related U.S. Application Data

(60) Provisional application No. 63/168,420, filed on Mar. 31, 2021.

(51) Int. Cl.
*H04W 8/22* (2009.01)
*H04L 5/00* (2006.01)
*H04W 72/1263* (2023.01)
*H04W 72/542* (2023.01)

(52) U.S. Cl.
CPC .............. *H04W 8/22* (2013.01); *H04L 5/0051* (2013.01); *H04W 72/1263* (2013.01); *H04W 72/542* (2023.01)

(58) Field of Classification Search
CPC .... H04W 24/10; H04W 24/08; H04L 5/0051; H04B 7/088; H04B 7/0617; H04B 7/0626
See application file for complete search history.

(56) References Cited

U.S. PATENT DOCUMENTS

| | | | |
|---|---|---|---|
| 2020/0145172 A1 | 5/2020 | Zhou et al. | |
| 2020/0178280 A1* | 6/2020 | Guan | H04B 7/0626 |
| 2022/0345283 A1* | 10/2022 | Matsumura | H04L 5/0094 |
| 2022/0385429 A1* | 12/2022 | Ma | H04L 5/0053 |

(Continued)

FOREIGN PATENT DOCUMENTS

WO    2020144639 A1    7/2020

OTHER PUBLICATIONS

International Search Report and Written Opinion—PCT/US2022/070397—ISA/EPO—May 11, 2022.

(Continued)

*Primary Examiner* — Romani Ohri
(74) *Attorney, Agent, or Firm* — Muncy, Geissler, Olds & Lowe, P.C.

(57) ABSTRACT

Disclosed are techniques for wireless communication. In an aspect, a UE transmits an indication of capability of the UE to support one or more reference signal (RS) types as a quasi co-location (QCL) source RS for one or more transmission configuration indicator (TCI) states. A base station receives the indication, and determine a TCI state with a QCL source RS based on the indication of the UE capability. The base station transmits, to the UE, a designation of the TCI state with the QCL source RS associated with one or more scheduled communications.

30 Claims, 8 Drawing Sheets

(56) References Cited

U.S. PATENT DOCUMENTS

| | | | | |
|---|---|---|---|---|
| 2023/0036639 A1* | 2/2023 | Hakola | ................ | H04B 7/088 |
| 2023/0112271 A1* | 4/2023 | Kim | .................... | H04L 5/0053 |
| | | | | 370/329 |
| 2023/0122786 A1* | 4/2023 | Bang | ................ | H04W 72/1268 |
| | | | | 370/329 |

OTHER PUBLICATIONS

LG Electronics: "Feature Lead Summary of Enhancements on Multi-Beam Operations", 3GPP TSG RAN WG1 Meeting #98, 3GPP Draft, R1-1909486, vol. RAN WG1, No. Prague, CZ, Aug. 26, 2019-Aug. 30, 2019, Sep. 3, 2019 (Sep. 3, 2019), pp. 1-35, XP051766088, Retrieved from the Internet: URL: http://www.3gpp.org/ftp/tsg_ran/WG1_RL1/TSGR1_98/Docs/R1-1909486.zip, [retrieved on Sep. 3, 2019], Sections 1-4.

* cited by examiner

QUASI CO-LOCATION SOURCE REFERENCE SIGNAL CAPABILITY FOR TRANSMISSION CONFIGURATION INDICATION STATE

CROSS-REFERENCE TO RELATED APPLICATIONS

The present application for patent claims the benefit of U.S. Provisional Application No. 63/168,420, entitled "QUASI CO-LOCATION SOURCE REFERENCE SIGNAL CAPABILITY FOR TRANSMISSION CONFIGURATION INDICATION STATE," filed Mar. 31, 2021, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes transmitting an indication of capability of the UE to support one or more reference signal (RS) types as a quasi co-location (QCL) source RS for one or more transmission configuration indicator (TCI) states; and receiving a designation of a TCI state with a QCL source RS associated with one or more scheduled communications, the QCL source RS of the designated TCI state being based on the indication of the UE capability.

In an aspect, a method of operating a base station includes receiving an indication of capability of a user equipment (UE) to support one or more reference signal (RS) types as a quasi co-location (QCL) source RS for one or more transmission configuration indicator (TCI) states; determining a TCI state with a QCL source RS based on the indication of the UE capability; and transmitting, to the UE, a designation of the TCI state with the QCL source RS associated with one or more scheduled communications.

In an aspect, a user equipment (UE) includes a memory; at least one transceiver; and at least one processor communicatively coupled to the memory and the at least one transceiver, the at least one processor configured to: transmit, via the at least one transceiver, an indication of capability of the UE to support one or more reference signal (RS) types as a quasi co-location (QCL) source RS for one or more transmission configuration indicator (TCI) states; and receive, via the at least one transceiver, a designation of a TCI state with a QCL source RS associated with one or more scheduled communications, the QCL source RS of the designated TCI state being based on the indication of the UE capability.

In an aspect, a base station includes a memory; at least one transceiver; and at least one processor communicatively coupled to the memory and the at least one transceiver, the at least one processor configured to: receive, via the at least one transceiver, an indication of capability of a user equipment (UE) to support one or more reference signal (RS) types as a quasi co-location (QCL) source RS for one or more transmission configuration indicator (TCI) states; determine a TCI state with a QCL source RS based on the indication of the UE capability; and transmit, via the at least one transceiver, to the UE, a designation of the TCI state with the QCL source RS associated with one or more scheduled communications.

In an aspect, a user equipment (UE) includes means for transmitting an indication of capability of the UE to support one or more reference signal (RS) types as a quasi co-location (QCL) source RS for one or more transmission configuration indicator (TCI) states; and means for receiving a designation of a TCI state with a QCL source RS associated with one or more scheduled communications, the QCL source RS of the designated TCI state being based on the indication of the UE capability.

In an aspect, a base station includes means for receiving an indication of capability of a user equipment (UE) to support one or more reference signal (RS) types as a quasi co-location (QCL) source RS for one or more transmission configuration indicator (TCI) states; means for determining a TCI state with a QCL source RS based on the indication of the UE capability; and means for transmitting, to the UE, a designation of the TCI state with the QCL source RS associated with one or more scheduled communications.

In an aspect, a non-transitory computer-readable medium storing computer-executable instructions that, when executed by a user equipment (UE), cause the UE to: transmit an indication of capability of the UE to support one or more reference signal (RS) types as a quasi co-location (QCL) source RS for one or more transmission configuration indicator (TCI) states; and receive a designation of a TCI state with a QCL source RS associated with one or more scheduled communications, the QCL source RS of the designated TCI state being based on the indication of the UE capability.

In an aspect, a non-transitory computer-readable medium storing computer-executable instructions that, when executed by a base station, cause the base station to: receive an indication of capability of a user equipment (UE) to support one or more reference signal (RS) types as a quasi co-location (QCL) source RS for one or more transmission configuration indicator (TCI) states; determine a TCI state with a QCL source RS based on the indication of the UE capability; and transmit, to the UE, a designation of the TCI state with the QCL source RS associated with one or more scheduled communications.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
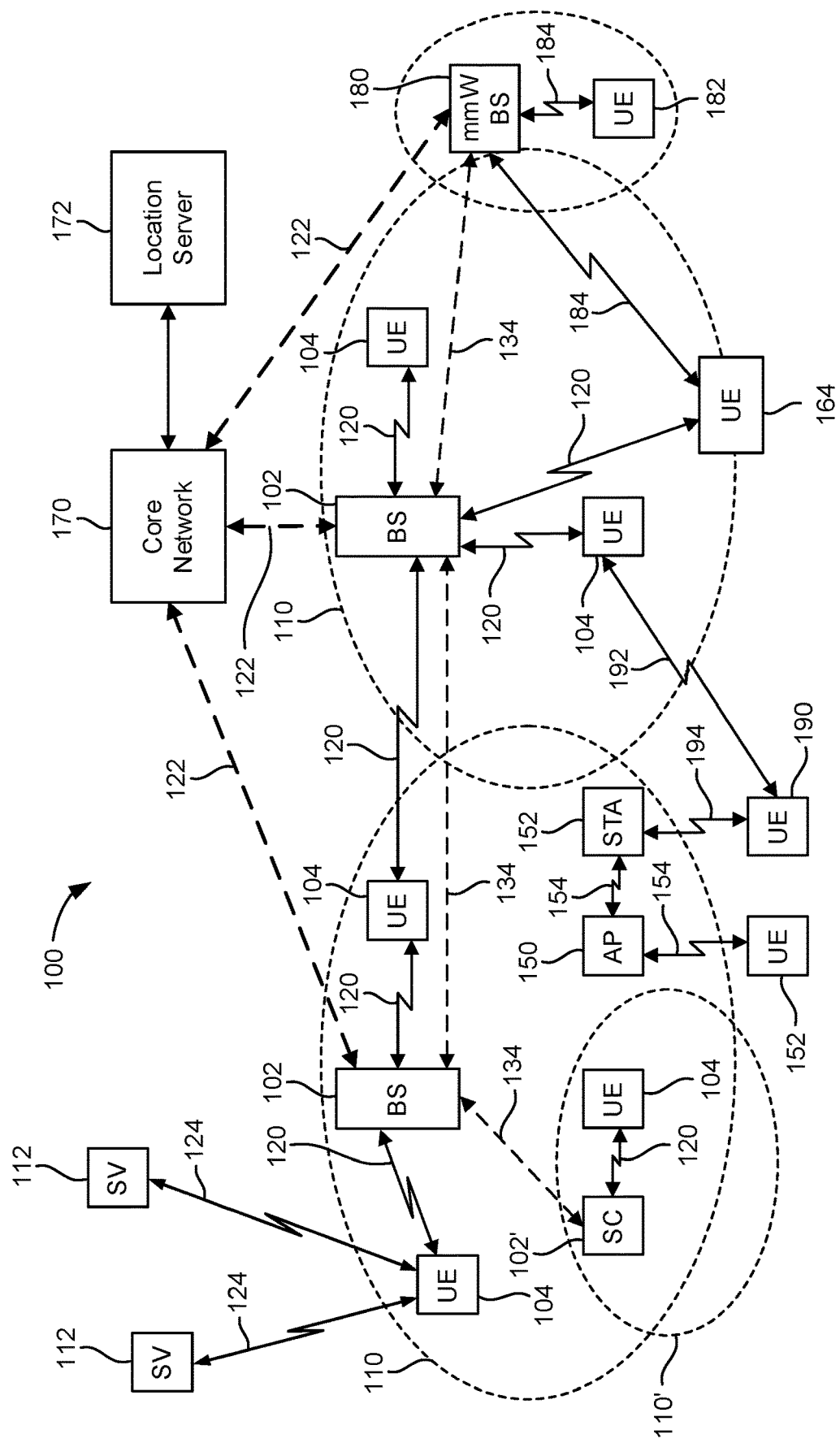
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
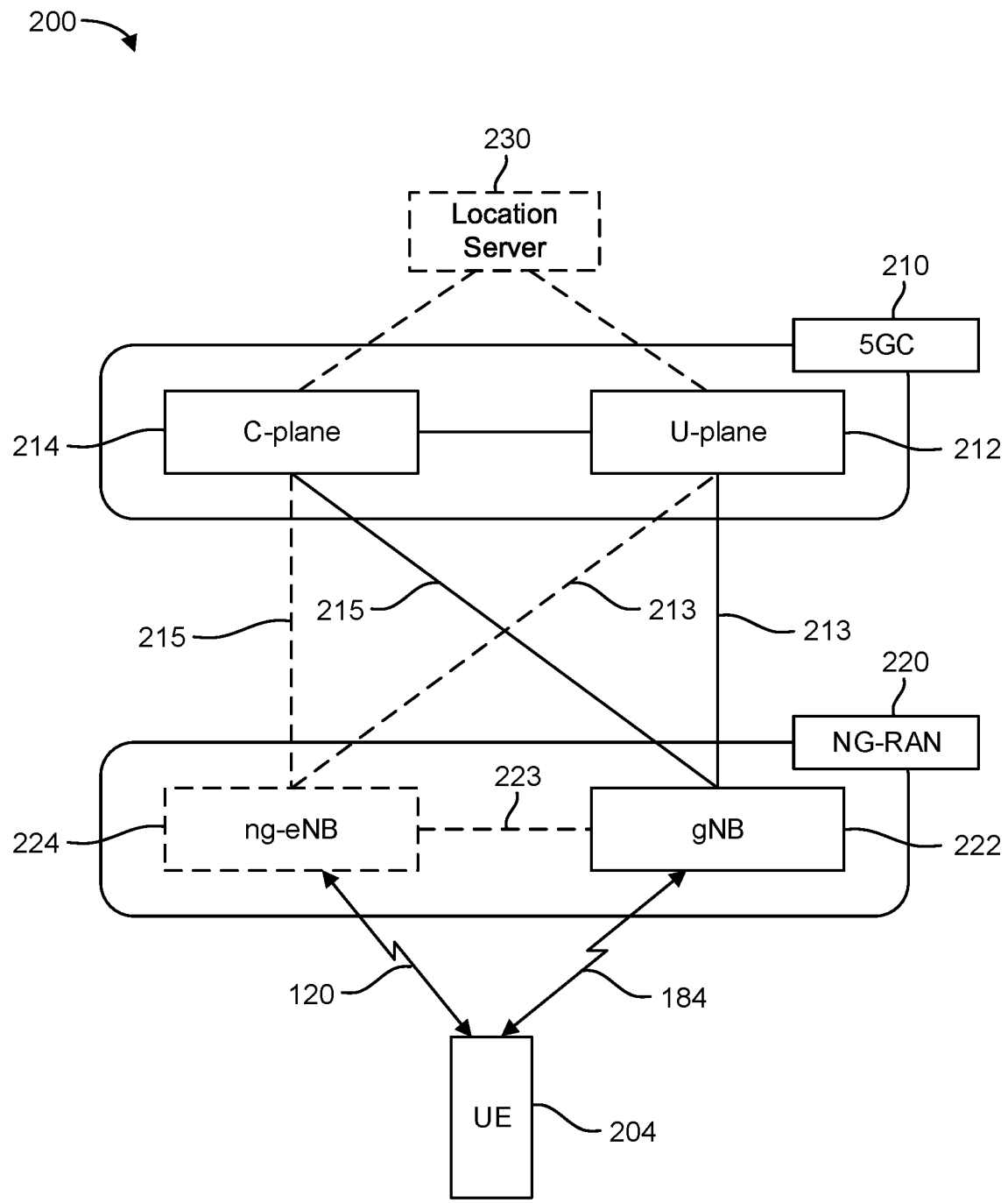
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
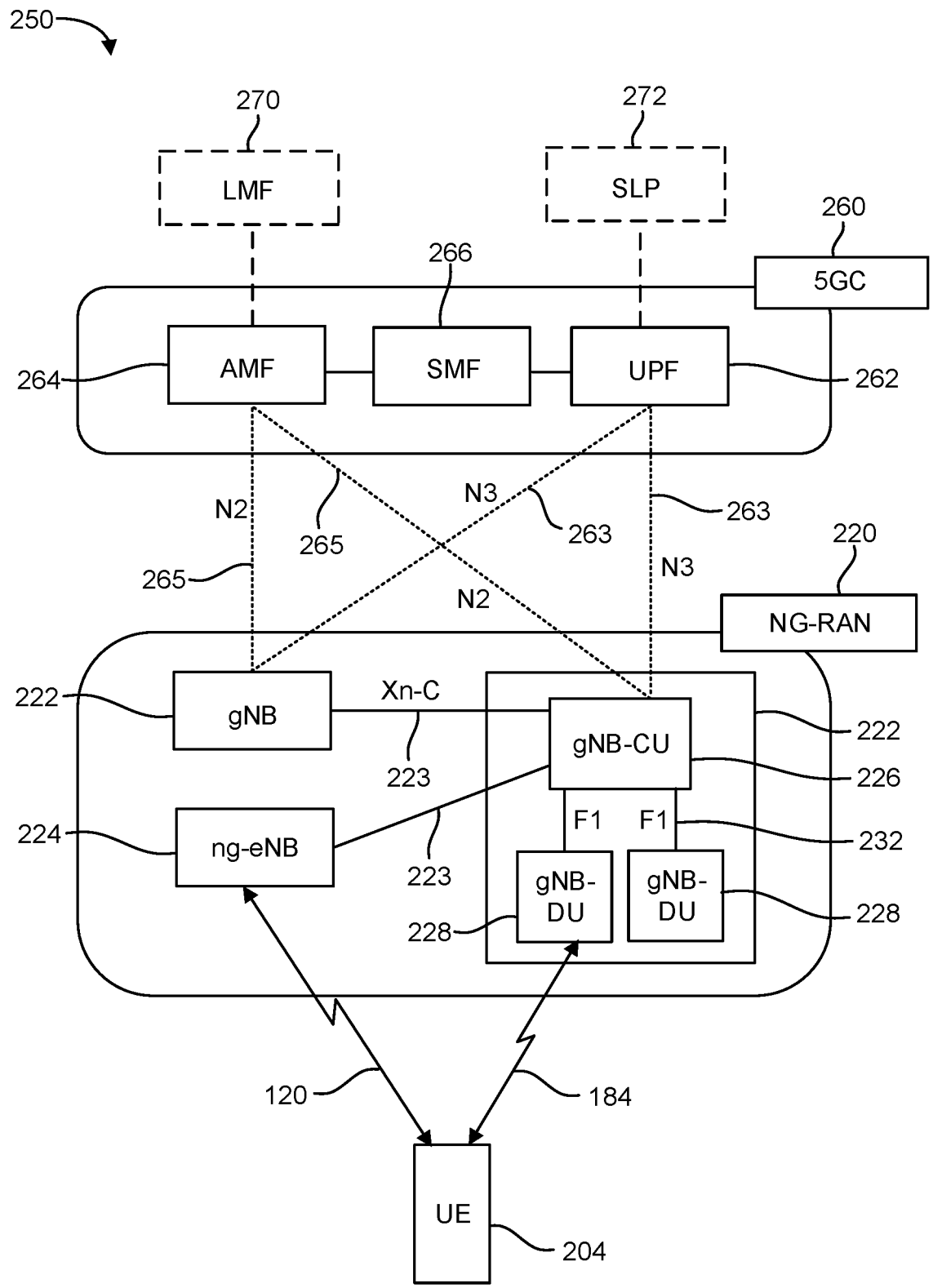

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
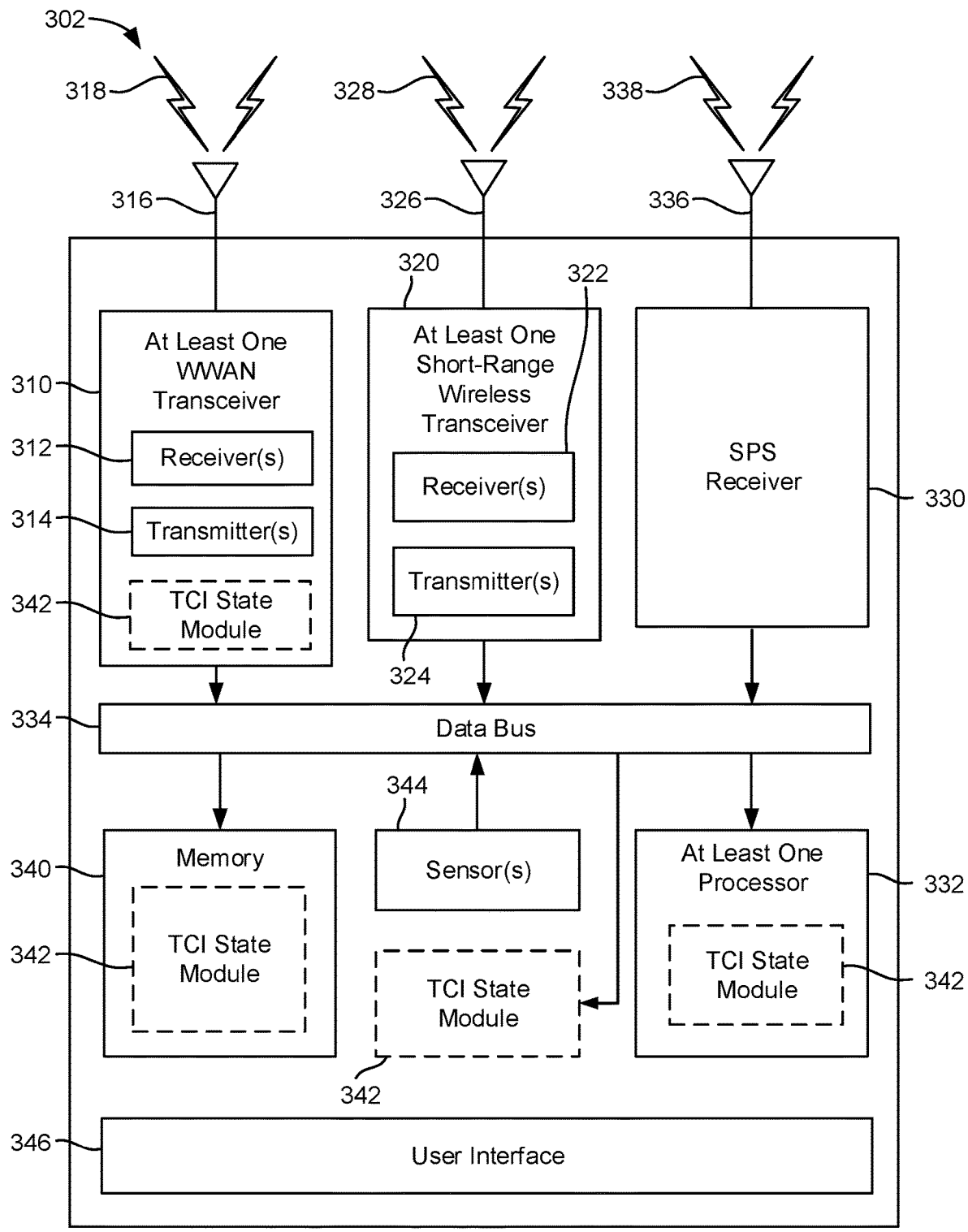
FIGS. 3A, 3B, and 3C are simplified block diagrams of several sample aspects of components that may be employed in a user equipment (UE), a base station, and a network entity, respectively, and configured to support communications as taught herein.
Figure 3B:
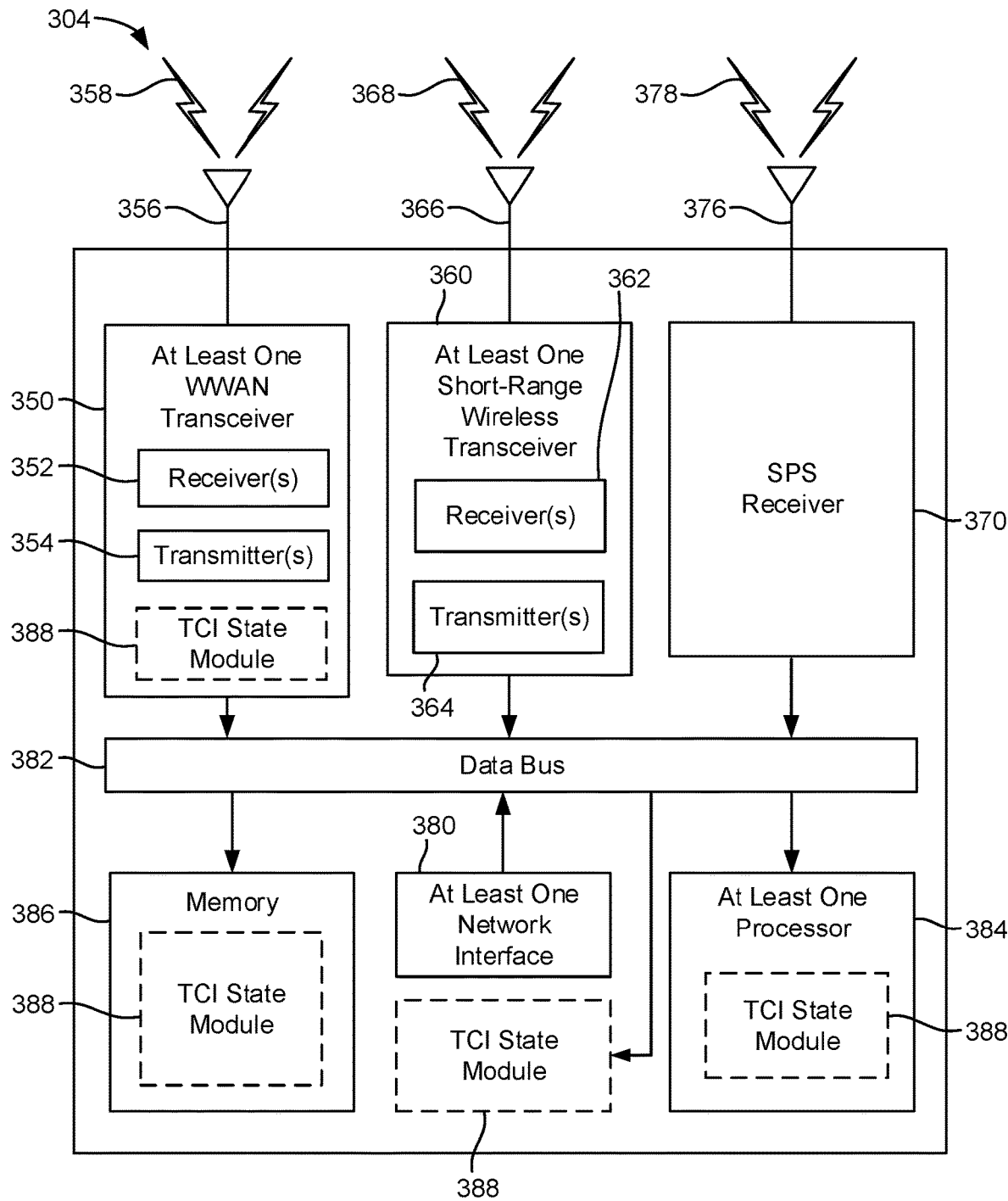
Figure 3C:
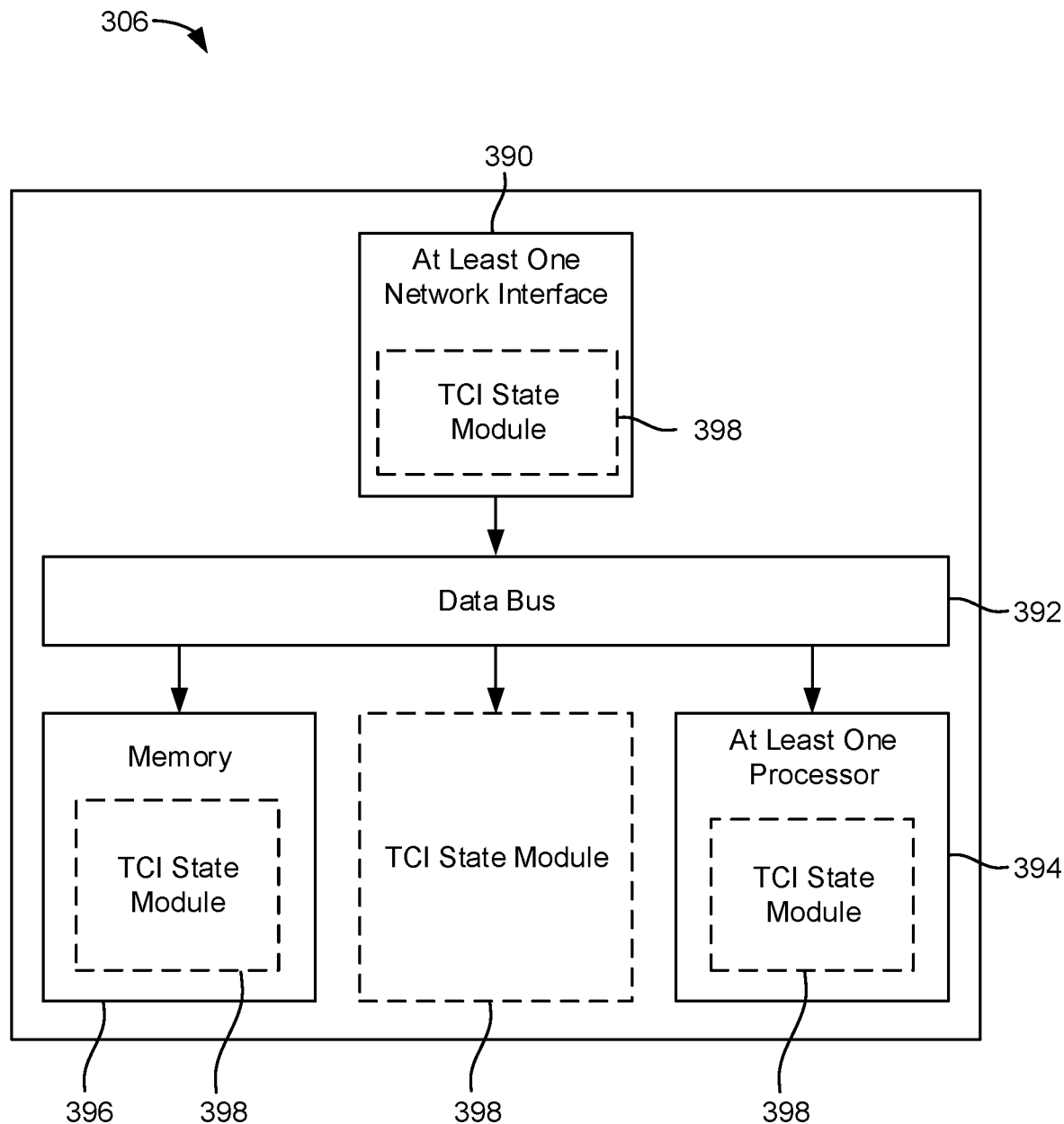

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include TCI State Modules 342, 388, and 398, respectively. The TCI State Modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the TCI State Modules 342, 388, and 398 may be external to the processors 332, 384, and 394 (e.g., part of a modem processing system, integrated with another processing system, etc.). Alternatively, the TCI State Modules 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the TCI State Module 342, which may be, for example, part of the at least one WWAN transceiver 310, the memory component 340, the at least one processor 332, or any combination thereof, or may be a standalone component. FIG. 3B illustrates possible locations of the TCI State Module 388, which may be, for example, part of the at least one WWAN transceiver 350, the memory component 386, the at least one processor 384, or any combination thereof, or may be a standalone component.

FIG. 3C illustrates possible locations of the TCI State Module 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the TCI State Modules 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

In 3GPP Rel. 15-16, a transmission configuration indicator (TCI) state is used to label gNB-side transmit (Tx) beams. For example, when PDCCH schedules a PDSCH, the TCI state for the scheduled PDSCH is indicated to UE, such that UE knows which gNB transmits the scheduled PDSCH, and how to receive the scheduled PDSCH. In 3GPP Rel. 15-16, SSB and CSI-RS may be used as a QCL source RS. For example, assume that a CSI-RS or SSB is used as a QCL source RS of a TCI state of QCL Type D. Later, when the PDSCH comes from the TCI state beam, UE will use the same Rx filter to receive PDSCH as to receive the QCL source RS.

In 3GPP Rel. 15-16, spatial relationship information in a TCI state can indicate one beamformed channel for a single DL channel or reference signal (RS) at a time. In 3GPP Rel. 17, three new types of TCI states have been introduced, which can be configured via RRC and then updated via DCI. The corresponding beam indication application time is counted either from the end of DCI or the end of acknowledgement to the DCI, e.g.:

Joint DL/UL common TCI state to indicate a common beam for at least one DL channel/RS plus at least one UL channel/RS, Separate DL common TCI state to indicate a common beam for at least two DL channel/RS, or Separate UL common TCI state to indicate a common beam for at least two UL channel/RS The various TCI states may be characterized as TCI states Types 1-5, as follows:

Type 1: Joint DL/UL common TCI state to indicate a common beam for at least one DL channel/RS plus at least one UL channel/RS Type 2: Separate DL common TCI state to indicate a common beam for more than one DL channel/RS Type 3: Separate UL common TCI state to indicate a common beam for more than one UL channel/RS Type 4: Separate DL single channel/RS TCI state to indicate a beam for a single DL channel/RS Type 5: Separate UL single channel/RS TCI state to indicate a beam for a single UL channel/RS In 3GPP Rel. 17 with respect to unified TCI framework, the supported source/target QCL relations in some designs is supported for QCL Type D. This implies that the following QCL source RS types for DL QCL (Type D, for DL RX spatial filter reference) information for DL UE-dedicated reception on PDSCH and all/subset of CORESETs are supported:

CSI-RS for beam management (BM), and
CSI-RS for tracking.

In some designs, SSB, CSI-RS for CSI acquisition, and/or SRS for BM may also be supported as QCL source RS types.

In 3GPP Rel. 17 with respect to unified TCI framework, the following QCL source RS types for UL TX spatial filter are supported:

CSI-RS for tracking,
SRS for BM,
SSB, and
CSI-RS for BM

In some designs, non-BM CSI-RS other than for tracking and/or SRS for non-BM may also be supported as QCL source RS types.

As noted above, various device types may be characterized as UEs. Starting in 3GPP Rel. 17, a number of these UE types (so-called low-tier UEs) are being allocated a new UE classification denoted as Reduced Capability ('RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on.

Upcoming releases of NR have contemplated the adoption of a new UE class characterized as 'NR-Superlight', which is associated with capabilities that are further reduced relative to RedCap UEs as described above. NR-Superlight UEs may utilize low-power modes of operation and low-complexity signaling (e.g., low-complexity sidelink signaling). Upcoming releases of NR may define improvements in coverage, complexity, power consumption, and/or the like, which may be beneficial for UEs that support low power wide area (LPWA) uses cases, such as NR-Superlight UEs. NR-Superlight UEs that support the LPWA use cases may include metering devices, asset tracking devices, personal IoT devices, and/or the like.

In some designs, not all RS types are needed for QCL source RS to establish a TCI state. For example, supporting more RS types as QCL source RC (e.g., support SRS for DL TCI state may increase implementation complexity and require higher UE capability. Moreover, due to differences in capabilities between UEs, some UEs (e.g., RedCap UEs, NR-Superlight UEs, etc.) may be limited in terms QCL source RS capability. For example, some UEs (e.g., RedCap UEs, NR-Superlight UEs, etc.) without full DL/UL reciprocity may not support certain UL RS as source for DL or joint TCI (e.g., TCI states Types 1 or 2 or 4). Based on UE capability, some UEs (e.g., RedCap UEs, NR-Superlight UEs, etc.) may not be able to synchronize time/frequency based on receiving certain type of RSs. For example, some UEs (e.g., RedCap UEs, NR-Superlight UEs, etc.) cannot synchronize time/frequency well based on CSI-RS for non-BM or SSB for non-BM, and hence may not be able to receive PDSCH/PDCCH scheduled on a TCI state whose QCL source RS is one of the above-noted types.

Aspects of the disclosure are directed to transmission of an indication of capability of a UE to support one or more RS types as a QCL source RS for one or more TCI states. In some designs, a base station may determine a TCI state with a QCL source RS based on the indication of the UE capability. Such aspects may provide various technical advantages, such as ensuring that a TCI state allocated to the UE is supported by the UE, which may help to improve resource allocation and may particularly improve communicative performance of UEs that are limited in terms of QCL source RS, such as RedCap UEs or NR-Superlight UEs.

Figure 4:
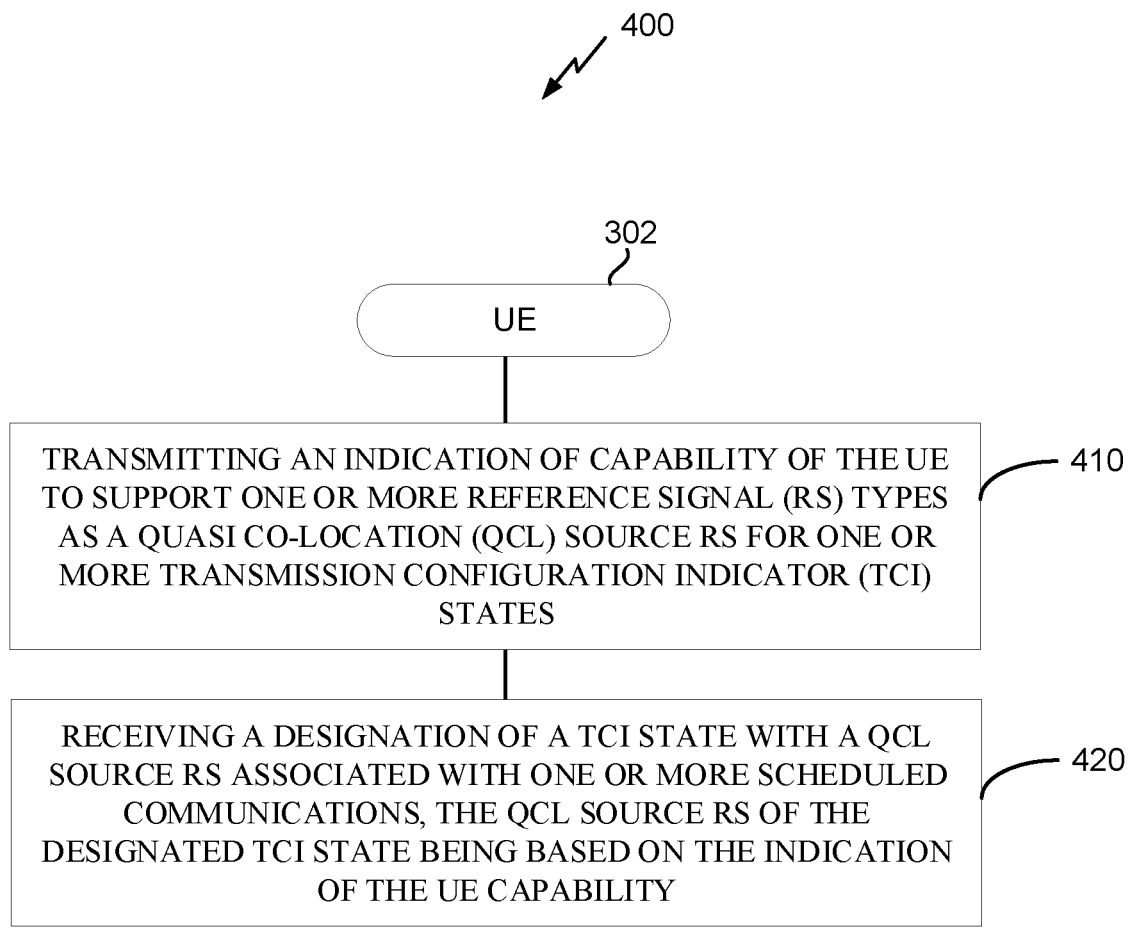
FIGS. 4-5 illustrate example methods of wireless communication, according to aspects of the disclosure.

FIG. 4 illustrates an exemplary process 400 of wireless communication, according to aspects of the disclosure. In an aspect, the process 400 may be performed by UE 302.

At 410, UE 302 (e.g., transmitter 314 or 324, etc.) transmits an indication of capability of the UE to support one or more reference signal (RS) types as a quasi co-location (QCL) source RS for one or more transmission configuration indicator (TCI) states. In some designs, the transmission of 410 may be implemented via RRC signaling (e.g., in capability exchange phase in conjunction with Attach procedure).

At 420, UE 302 (e.g., receiver 312 or 322, etc.) receives a designation of a TCI state with a QCL source RS associated with one or more scheduled communications, the QCL source RS of the designated TCI state being based on the indication of the UE capability. In some designs, the reception of 410 may be implemented via RRC signaling. In other designs, the reception of 420 may be implemented via DCI.

Figure 5:
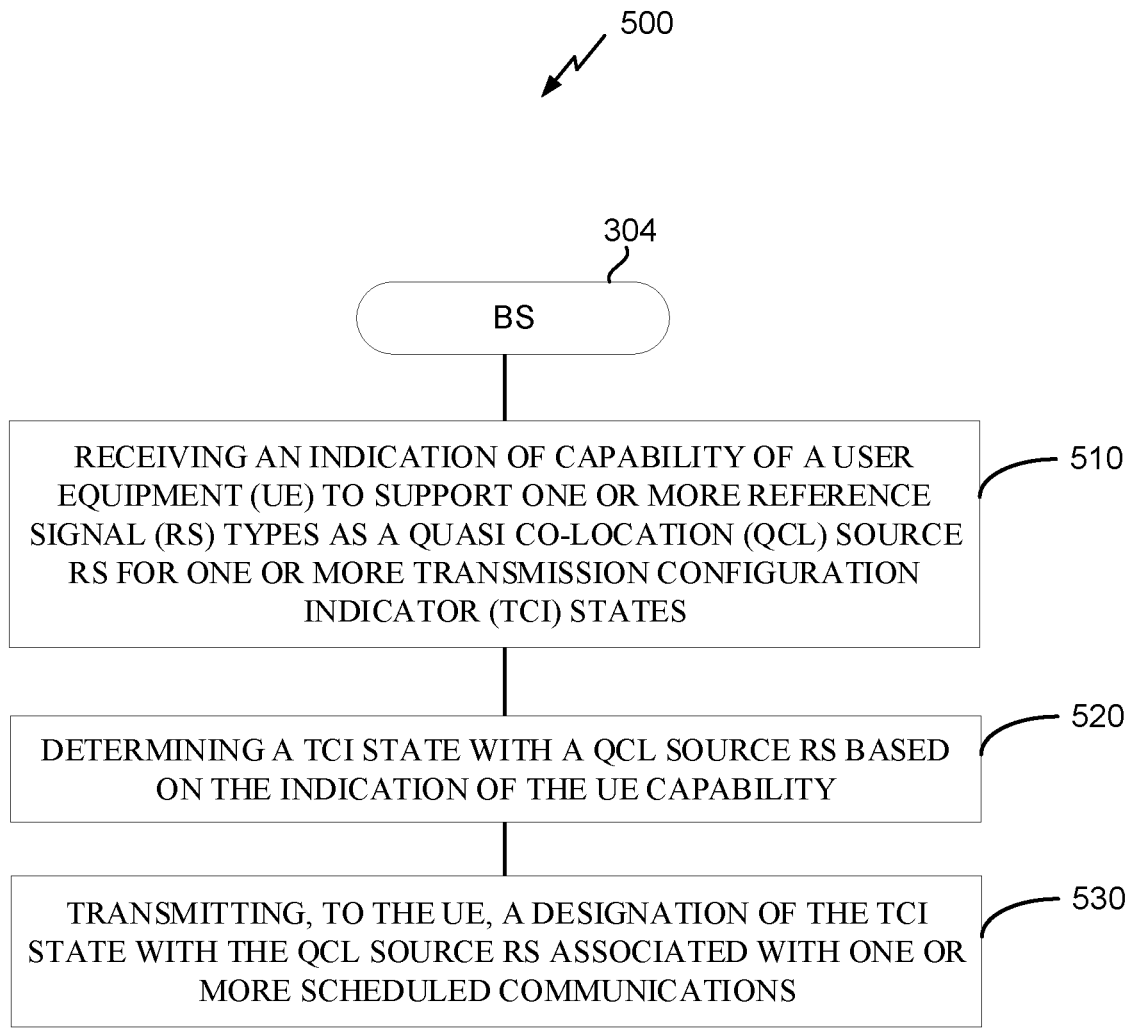

FIG. 5 illustrates an exemplary process 500 of wireless communication, according to aspects of the disclosure. In an aspect, the process 500 may be performed by BS 304.

At 510, BS 304 (e.g., receiver 352 or 362, etc.) receives an indication of capability of a user equipment (UE) to support one or more reference signal (RS) types as a quasi co-location (QCL) source RS for one or more transmission configuration indicator (TCI) states.

At 520, BS 304 (e.g., processor(s) 332, TCI State Module 388, etc.) determines a TCI state with a QCL source RS based on the indication of the UE capability. For example, BS 304 may determine a QCL source RS that is supported by the UE for the associated TCI state based on the capability indication.

At 530, BS 304 (e.g., transmitter 354 or 364, etc.) transmits, to the UE, a designation of the TCI state with the QCL source RS associated with one or more scheduled communications. In some designs, the transmission of 530 may be implemented via RRC signaling. In other designs, the transmission of 530 may be implemented via DCI.

Referring to FIGS. 4-5, in some designs, the one or more scheduled communications comprises one or more downlink communications, one or more uplink communications, or a combination thereof. In some designs, the scheduled UL or DL communications may comprise channel(s), such as physical downlink control channel (PDCCH), physical downlink shared channel (PDSCH), physical uplink control channel (PUCCH), physical uplink shared channel (PUSCH), or a combination thereof. These respective channels may be UE-specific or non-UE specific. In an example, PDSCH, PUCCH and/or PUSCH can be dynamically scheduled by DCI, semi-statically activated by DCI/MAC-CE, or semi-statically configured by RRC. In some designs, PDSCH may include the case that the scheduling offset between DCI and PDSCH is equal to or greater than the beam switch latency threshold, and/or the case that the scheduling offset is less than the threshold. In some designs, PDCCH may be carried by all or a subset of CORESETs. In some designs, PUCCH may be all or a subset of corresponding configured resources.

Referring to FIGS. 4-5, in some designs, the scheduled UL or DL communications may comprise RS(s), such as a synchronization signal block (SSB), a periodic, semi-persistent, or a periodic channel state information RS (CSI-RS) or positioning RS (PRS) or sounding reference signal (SRS), or a combination thereof. In some designs, the CSI-RS, PRS and/or SRS may be periodic (P), semi-persistent (SP) or aperiodic (AP). In an example, the purpose of CSI-RS can be for CSI acquisition/measurement/report (without higher layer parameter trs-Info and Repetition), beam measurement/report (with higher layer parameter Repetition), or TRS measurement (with higher layer parameter trs-Info). In a further example, the purpose of SRS can be for antenna switching, beam management, codebook based PUSCH, and non-codebook based PUSCH. In some designs, SSB, CSI-RS, PRS and/or SRS may be all or a subset of corresponding configured resources.

Referring to FIGS. 4-5, in some designs, the indication of the UE capability indicates whether the UE supports as a respective QCL source RS type:

channel state information RS (CSI-RS) for beam management (BM), including periodic RS, semi-persistent CSI RS, aperiodic CSI RS, and CSI RS with RRC parameter repetition 'ON' for UE side beam refinement;

CSI-RS for non-BM (e.g., one or more of CSI-RS for tracking, CSI-RS for CSI acquisition, CSI-RS for interference management, CSI-RS for mobility, or a combination thereof), sounding reference signal (SRS) resource or resource set for BM;

SRS or SRS resource set for non-BM (e.g., antenna switching, codebook-based physical uplink shared channel (PUSCH), non-codebook-based PUSCH, or a combination thereof), SSB for BM or non-BM, or an RS for positioning (RS-P) (e.g., DL-PRS, UL-SRS-P, SL-PRS, etc.), or a combination thereof.

Referring to FIGS. 4-5, in some designs, the indication of the UE capability indicates whether link reciprocity between an uplink beam and a downlink beam is supported by the UE. For example, if the UE does not support link reciprocity, then a UL RS cannot be used as a QCL source RS for DL channel or RS, and DL RS cannot be used as a QCL source RS for UL channel or RS.

Referring to FIGS. 4-5, in some designs, the indication of the UE capability may be per QCL type, per TCI state, per cell, or a combination thereof. In an example where the indication of the UE capability is per QCL type, the indication of the UE capability may indicate one or more QCL types (e.g., QCL Type A, QCL Type B, QCL Type C, QCL Type D, or a combination thereof) supported by the UE for each of the one or more RS types as QCL source RS. In an example where the indication of the UE capability is per TCI state, the indication of the UE capability may indicate one or more TCI states supported by the UE for each of the one or more RS types as QCL source RS. For example, the one or more TCI states may correspond to any combination of TCI states Types 1-5 as described above, e.g.:

a first TCI state (e.g., Type 1) that indicates a first common beam for at least one downlink channel or RS and at least one uplink channel or RS, or a second TCI state (e.g., Type 2) that indicates a second common beam for at least one respective downlink channel or RS only, or a third TCI state (e.g., Type 3) that indicates a third common beam for at least one respective uplink channel or RS only, or a fourth TCI state (e.g., Type 4) that indicates a respective beam for a single downlink channel or RS, or a fifth TCI state (e.g., Type 5) that indicates a respective beam for a single uplink channel or RS, or a combination thereof Referring to FIGS. 4-5, in an example where the indication of the UE capability per cell, the indication of the UE capability may indicate support for a given RS type for a serving cell and a lack of support for the given RS type for a non-serving cell. In a specific example, a serving cell CSI-RS for CSI acquisition may be used as QCL source RS, and a non-serving cell CSI-RS for CSI acquisition may not be used as QCL source RS.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: transmitting an indication of capability of the UE to support one or more reference signal (RS) types as a quasi co-location (QCL) source RS for one or more transmission configuration indicator (TCI) states; and receiving a designation of a TCI state with a QCL source RS associated with one or more scheduled communications, the QCL source RS of the designated TCI state being based on the indication of the UE capability.

Clause 2. The method of clause 1, wherein the one or more scheduled communications comprises one or more downlink communications, one or more uplink communications, or a combination thereof.

Clause 3. The method of clause 2, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 4. The method of any of clauses 1 to 3, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, SSB for BM or non-BM, or an RS for positioning (RS-P), or a combination thereof.

Clause 5. The method of clause 4, wherein the CSI-RS for non-BM comprises one or more of CSI-RS for tracking, CSI-RS for CSI acquisition, CSI-RS for interference management, CSI-RS for mobility, or a combination thereof.

Clause 6. The method of any of clauses 4 to 5, wherein the SRS or SRS resource set for non-BM comprises antenna switching, codebook-based physical uplink shared channel (PUSCH), non-codebook-based PUSCH, or a combination thereof.

Clause 7. The method of any of clauses 1 to 6, wherein the indication of the UE capability indicates whether link reciprocity between an uplink beam and a downlink beam is supported by the UE.

Clause 8. The method of any of clauses 1 to 7, wherein the indication of the UE capability is per QCL type, per TCI state, per cell, or a combination thereof.

Clause 9. The method of clause 8, wherein the indication of the UE capability is per QCL type, and indicates one or more QCL types supported by the UE for each of the one or more RS types as QCL source RS.

Clause 10. The method of clause 9, wherein the one or more QCL type comprises QCL Type A, QCL Type B, QCL Type C, QCL Type D, or a combination thereof.

Clause 11. The method of any of clauses 8 to 10, wherein the indication of the UE capability is per TCI state, and indicates one or more TCI states supported by the UE for each of the one or more RS types as QCL source RS.

Clause 12. The method of clause 11, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 13. The method of any of clauses 8 to 12, wherein the indication of the UE capability is per cell.

Clause 14. The method of clause 13, wherein the indication of the UE capability indicates support for a given RS type for a serving cell and a lack of support for the given RS type for a non-serving cell.

Clause 15. A method of operating a base station, comprising: receiving an indication of capability of a user equipment (UE) to support one or more reference signal (RS) types as a quasi co-location (QCL) source RS for one or more transmission configuration indicator (TCI) states; determining a TCI state with a QCL source RS based on the indication of the UE capability; and transmitting, to the UE, a designation of the TCI state with the QCL source RS associated with one or more scheduled communications.

Clause 16. The method of clause 15, wherein the one or more scheduled communications comprises one or more downlink communications, one or more uplink communications, or a combination thereof.

Clause 17. The method of clause 16, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 18. The method of any of clauses 15 to 17, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, or SSB for BM or non-BM, or an RS for positioning (RS-P), or a combination thereof.

Clause 19. The method of clause 18, wherein the CSI-RS for non-BM comprises one or more of CSI-RS for tracking, CSI-RS for CSI acquisition, CSI-RS for interference management, CSI-RS for mobility, or a combination thereof.

Clause 20. The method of any of clauses 18 to 19, wherein the SRS or SRS resource set for non-BM comprises antenna switching, codebook-based physical uplink shared channel (PUSCH), non-codebook-based PUSCH, or a combination thereof.

Clause 21. The method of any of clauses 15 to 20, wherein the indication of the UE capability indicates whether link reciprocity between an uplink beam and a downlink beam is supported by the UE.

Clause 22. The method of any of clauses 15 to 21, wherein the indication of the UE capability is per QCL type, per TCI state, per cell, or a combination thereof.

Clause 23. The method of clause 22, wherein the indication of the UE capability is per QCL type, and indicates one or more QCL types supported by the UE for each of the one or more RS types as QCL source RS.

Clause 24. The method of clause 23, wherein the one or more QCL type comprises QCL Type A, QCL Type B, QCL Type C, QCL Type D, or a combination thereof.

Clause 25. The method of any of clauses 22 to 24, wherein the indication of the UE capability is per TCI state, and indicates one or more TCI states supported by the UE for each of the one or more RS types as QCL source RS.

Clause 26. The method of clause 25, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 27. The method of any of clauses 22 to 26, wherein the indication of the UE capability is per cell.

Clause 28. The method of clause 27, wherein the indication of the UE capability indicates support for a given RS type for a serving cell and a lack of support for the given RS type for a non-serving cell.

Clause 29. A user equipment (UE), comprising: a memory; at least one transceiver; and at least one processor communicatively coupled to the memory and the at least one transceiver, the at least one processor configured to: transmit, via the at least one transceiver, an indication of capability of the UE to support one or more reference signal (RS) types as a quasi co-location (QCL) source RS for one or more transmission configuration indicator (TCI) states; and receive, via the at least one transceiver, a designation of a TCI state with a QCL source RS associated with one or more scheduled communications, the QCL source RS of the designated TCI state being based on the indication of the UE capability.

Clause 30. The UE of clause 29, wherein the one or more scheduled communications comprises one or more downlink communications, one or more uplink communications, or a combination thereof.

Clause 31. The UE of clause 30, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 32. The UE of any of clauses 29 to 31, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, SSB for BM or non-BM, or an RS for positioning (RS-P), or a combination thereof.

Clause 33. The UE of clause 32, wherein the CSI-RS for non-BM comprises one or more of CSI-RS for tracking, CSI-RS for CSI acquisition, CSI-RS for interference management, CSI-RS for mobility, or a combination thereof.

Clause 34. The UE of any of clauses 32 to 33, wherein the SRS or SRS resource set for non-BM comprises antenna switching, codebook-based physical uplink shared channel (PUSCH), non-codebook-based PUSCH, or a combination thereof.

Clause 35. The UE of any of clauses 29 to 34, wherein the indication of the UE capability indicates whether link reciprocity between an uplink beam and a downlink beam is supported by the UE.

Clause 36. The UE of any of clauses 29 to 35, wherein the indication of the UE capability is per QCL type, per TCI state, per cell, or a combination thereof.

Clause 37. The UE of clause 36, wherein the indication of the UE capability is per QCL type, and indicates one or more QCL types supported by the UE for each of the one or more RS types as QCL source RS.

Clause 38. The UE of clause 37, wherein the one or more QCL type comprises QCL Type A, QCL Type B, QCL Type C, QCL Type D, or a combination thereof.

Clause 39. The UE of any of clauses 36 to 38, wherein the indication of the UE capability is per TCI state, and indicates one or more TCI states supported by the UE for each of the one or more RS types as QCL source RS.

Clause 40. The UE of clause 39, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 41. The UE of any of clauses 36 to 40, wherein the indication of the UE capability is per cell.

Clause 42. The UE of clause 41, wherein the indication of the UE capability indicates support for a given RS type for a serving cell and a lack of support for the given RS type for a non-serving cell.

Clause 43. A base station, comprising: a memory; at least one transceiver; and at least one processor communicatively coupled to the memory and the at least one transceiver, the at least one processor configured to: receive, via the at least one transceiver, an indication of capability of a user equipment (UE) to support one or more reference signal (RS) types as a quasi co-location (QCL) source RS for one or more transmission configuration indicator (TCI) states; determine a TCI state with a QCL source RS based on the indication of the UE capability; and transmit, via the at least one transceiver, to the UE, a designation of the TCI state with the QCL source RS associated with one or more scheduled communications.

Clause 44. The base station of clause 43, wherein the one or more scheduled communications comprises one or more downlink communications, one or more uplink communications, or a combination thereof.

Clause 45. The base station of clause 44, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 46. The base station of any of clauses 43 to 45, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, or SSB for BM or non-BM, or an RS for positioning (RS-P), or or a combination thereof.

Clause 47. The base station of clause 46, wherein the CSI-RS for non-BM comprises one or more of CSI-RS for tracking, CSI-RS for CSI acquisition, CSI-RS for interference management, CSI-RS for mobility, or a combination thereof.

Clause 48. The base station of any of clauses 46 to 47, wherein the SRS or SRS resource set for non-BM comprises antenna switching, codebook-based physical uplink shared channel (PUSCH), non-codebook-based PUSCH, or a combination thereof.

Clause 49. The base station of any of clauses 43 to 48, wherein the indication of the UE capability indicates whether link reciprocity between an uplink beam and a downlink beam is supported by the UE.

Clause 50. The base station of any of clauses 43 to 49, wherein the indication of the UE capability is per QCL type, per TCI state, per cell, or a combination thereof.

Clause 51. The base station of clause 50, wherein the indication of the UE capability is per QCL type, and indicates one or more QCL types supported by the UE for each of the one or more RS types as QCL source RS.

Clause 52. The base station of clause 51, wherein the one or more QCL type comprises QCL Type A, QCL Type B, QCL Type C, QCL Type D, or a combination thereof.

Clause 53. The base station of any of clauses 50 to 52, wherein the indication of the UE capability is per TCI state, and indicates one or more TCI states supported by the UE for each of the one or more RS types as QCL source RS.

Clause 54. The base station of clause 53, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 55. The base station of any of clauses 50 to 54, wherein the indication of the UE capability is per cell.

Clause 56. The base station of clause 55, wherein the indication of the UE capability indicates support for a given RS type for a serving cell and a lack of support for the given RS type for a non-serving cell.

Clause 57. A user equipment (UE), comprising: means for transmitting an indication of capability of the UE to support one or more reference signal (RS) types as a quasi co-location (QCL) source RS for one or more transmission configuration indicator (TCI) states; and means for receiving a designation of a TCI state with a QCL source RS associated with one or more scheduled communications, the QCL source RS of the designated TCI state being based on the indication of the UE capability.

Clause 58. The UE of clause 57, wherein the one or more scheduled communications comprises one or more downlink communications, one or more uplink communications, or a combination thereof.

Clause 59. The UE of clause 58, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 60. The UE of any of clauses 57 to 59, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, SSB for BM or non-BM, or an RS for positioning (RS-P), or a combination thereof.

Clause 61. The UE of clause 60, wherein the CSI-RS for non-BM comprises one or more of CSI-RS for tracking, CSI-RS for CSI acquisition, CSI-RS for interference management, CSI-RS for mobility, or a combination thereof.

Clause 62. The UE of any of clauses 60 to 61, wherein the SRS or SRS resource set for non-BM comprises antenna switching, codebook-based physical uplink shared channel (PUSCH), non-codebook-based PUSCH, or a combination thereof.

Clause 63. The UE of any of clauses 57 to 62, wherein the indication of the UE capability indicates whether link reciprocity between an uplink beam and a downlink beam is supported by the UE.

Clause 64. The UE of any of clauses 57 to 63, wherein the indication of the UE capability is per QCL type, per TCI state, per cell, or a combination thereof.

Clause 65. The UE of clause 64, wherein the indication of the UE capability is per QCL type, and indicates one or more QCL types supported by the UE for each of the one or more RS types as QCL source RS.

Clause 66. The UE of clause 65, wherein the one or more QCL type comprises QCL Type A, QCL Type B, QCL Type C, QCL Type D, or a combination thereof.

Clause 67. The UE of any of clauses 64 to 66, wherein the indication of the UE capability is per TCI state, and indicates one or more TCI states supported by the UE for each of the one or more RS types as QCL source RS.

Clause 68. The UE of clause 67, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 69. The UE of any of clauses 64 to 68, wherein the indication of the UE capability is per cell.

Clause 70. The UE of clause 69, wherein the indication of the UE capability indicates support for a given RS type for a serving cell and a lack of support for the given RS type for a non-serving cell.

Clause 71. A base station, comprising: means for receiving an indication of capability of a user equipment (UE) to support one or more reference signal (RS) types as a quasi co-location (QCL) source RS for one or more transmission configuration indicator (TCI) states; means for determining a TCI state with a QCL source RS based on the indication of the UE capability; and means for transmitting, to the UE, a designation of the TCI state with the QCL source RS associated with one or more scheduled communications.

Clause 72. The base station of clause 71, wherein the one or more scheduled communications comprises one or more downlink communications, one or more uplink communications, or a combination thereof.

Clause 73. The base station of clause 72, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 74. The base station of any of clauses 71 to 73, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, or SSB for BM or non-BM, or an RS for positioning (RS-P), or or a combination thereof.

Clause 75. The base station of clause 74, wherein the CSI-RS for non-BM comprises one or more of CSI-RS for tracking, CSI-RS for CSI acquisition, CSI-RS for interference management, CSI-RS for mobility, or a combination thereof.

Clause 76. The base station of any of clauses 74 to 75, wherein the SRS or SRS resource set for non-BM comprises antenna switching, codebook-based physical uplink shared channel (PUSCH), non-codebook-based PUSCH, or a combination thereof.

Clause 77. The base station of any of clauses 71 to 76, wherein the indication of the UE capability indicates whether link reciprocity between an uplink beam and a downlink beam is supported by the UE.

Clause 78. The base station of any of clauses 71 to 77, wherein the indication of the UE capability is per QCL type, per TCI state, per cell, or a combination thereof.

Clause 79. The base station of clause 78, wherein the indication of the UE capability is per QCL type, and indicates one or more QCL types supported by the UE for each of the one or more RS types as QCL source RS.

Clause 80. The base station of clause 79, wherein the one or more QCL type comprises QCL Type A, QCL Type B, QCL Type C, QCL Type D, or a combination thereof.

Clause 81. The base station of any of clauses 78 to 80, wherein the indication of the UE capability is per TCI state, and indicates one or more TCI states supported by the UE for each of the one or more RS types as QCL source RS.

Clause 82. The base station of clause 81, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 83. The base station of any of clauses 78 to 82, wherein the indication of the UE capability is per cell.

Clause 84. The base station of clause 83, wherein the indication of the UE capability indicates support for a given RS type for a serving cell and a lack of support for the given RS type for a non-serving cell.

Clause 85. A non-transitory computer-readable medium storing computer-executable instructions that, when executed by a user equipment (UE), cause the UE to: transmit an indication of capability of the UE to support one or more reference signal (RS) types as a quasi co-location (QCL) source RS for one or more transmission configuration indicator (TCI) states; and receive a designation of a TCI state with a QCL source RS associated with one or more scheduled communications, the QCL source RS of the designated TCI state being based on the indication of the UE capability.

Clause 86. The non-transitory computer-readable medium of clause 85, wherein the one or more scheduled communications comprises one or more downlink communications, one or more uplink communications, or a combination thereof.

Clause 87. The non-transitory computer-readable medium of clause 86, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 88. The non-transitory computer-readable medium of any of clauses 85 to 87, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, SSB for BM or non-BM, or an RS for positioning (RS-P), or a combination thereof.

Clause 89. The non-transitory computer-readable medium of clause 88, wherein the CSI-RS for non-BM comprises one or more of CSI-RS for tracking, CSI-RS for CSI acquisition, CSI-RS for interference management, CSI-RS for mobility, or a combination thereof.

Clause 90. The non-transitory computer-readable medium of any of clauses 88 to 89, wherein the SRS or SRS resource set for non-BM comprises antenna switching, codebook-based physical uplink shared channel (PUSCH), non-codebook-based PUSCH, or a combination thereof.

Clause 91. The non-transitory computer-readable medium of any of clauses 85 to 90, wherein the indication of the UE capability indicates whether link reciprocity between an uplink beam and a downlink beam is supported by the UE.

Clause 92. The non-transitory computer-readable medium of any of clauses 85 to 91, wherein the indication of the UE capability is per QCL type, per TCI state, per cell, or a combination thereof.

Clause 93. The non-transitory computer-readable medium of clause 92, wherein the indication of the UE capability is per QCL type, and indicates one or more QCL types supported by the UE for each of the one or more RS types as QCL source RS.

Clause 94. The non-transitory computer-readable medium of clause 93, wherein the one or more QCL type comprises QCL Type A, QCL Type B, QCL Type C, QCL Type D, or a combination thereof.

Clause 95. The non-transitory computer-readable medium of any of clauses 92 to 94, wherein the indication of the UE capability is per TCI state, and indicates one or more TCI states supported by the UE for each of the one or more RS types as QCL source RS.

Clause 96. The non-transitory computer-readable medium of clause 95, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 97. The non-transitory computer-readable medium of any of clauses 92 to 96, wherein the indication of the UE capability is per cell.

Clause 98. The non-transitory computer-readable medium of clause 97, wherein the indication of the UE capability indicates support for a given RS type for a serving cell and a lack of support for the given RS type for a non-serving cell.

Clause 99. A non-transitory computer-readable medium storing computer-executable instructions that, when executed by a base station, cause the base station to: receive an indication of capability of a user equipment (UE) to support one or more reference signal (RS) types as a quasi co-location (QCL) source RS for one or more transmission configuration indicator (TCI) states; determine a TCI state with a QCL source RS based on the indication of the UE capability; and transmit, to the UE, a designation of the TCI state with the QCL source RS associated with one or more scheduled communications.

Clause 100. The non-transitory computer-readable medium of clause 99, wherein the one or more scheduled communications comprises one or more downlink communications, one or more uplink communications, or a combination thereof.

Clause 101. The non-transitory computer-readable medium of clause 100, wherein the one or more scheduled communications comprise physical downlink control channel (PDCCH), physical downlink shared channel (PDSCH), physical uplink control channel (PUCCH), physical uplink shared channel (PUSCH), or a combination thereof, or wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

Clause 102. The non-transitory computer-readable medium of any of clauses 99 to 101, wherein the indication of the UE capability indicates whether the UE supports as a respective QCL source RS type: channel state information RS (CSI-RS) for beam management (BM), or CSI-RS for non-BM, or sounding reference signal (SRS) resource or resource set for BM, or SRS or SRS resource set for non-BM, or SSB for BM or non-BM, or an RS for positioning (RS-P), or a combination thereof.

Clause 103. The non-transitory computer-readable medium of clause 102, wherein the CSI-RS for non-BM comprises one or more of CSI-RS for tracking, CSI-RS for CSI acquisition, CSI-RS for interference management, CSI-RS for mobility, or a combination thereof.

Clause 104. The non-transitory computer-readable medium of any of clauses 102 to 103, wherein the SRS or SRS resource set for non-BM comprises antenna switching, codebook-based physical uplink shared channel (PUSCH), non-codebook-based PUSCH, or a combination thereof.

Clause 105. The non-transitory computer-readable medium of any of clauses 99 to 104, wherein the indication of the UE capability indicates whether link reciprocity between an uplink beam and a downlink beam is supported by the UE.

Clause 106. The non-transitory computer-readable medium of any of clauses 99 to 105, wherein the indication of the UE capability is per QCL type, per TCI state, per cell, or a combination thereof.

Clause 107. The non-transitory computer-readable medium of clause 106, wherein the indication of the UE capability is per QCL type, and indicates one or more QCL types supported by the UE for each of the one or more RS types as QCL source RS.

Clause 108. The non-transitory computer-readable medium of clause 107, wherein the one or more QCL type comprises QCL Type A, QCL Type B, QCL Type C, QCL Type D, or a combination thereof.

Clause 109. The non-transitory computer-readable medium of any of clauses 106 to 108, wherein the indication of the UE capability is per TCI state, and indicates one or more TCI states supported by the UE for each of the one or more RS types as QCL source RS.

Clause 110. The non-transitory computer-readable medium of clause 109, wherein the one or more TCI states comprise: a first TCI state that indicates a first common beam for at least one downlink channel or RS and at least one uplink channel or RS, or a second TCI state that indicates a second common beam for at least one respective downlink channel or RS only, or a third TCI state that indicates a third common beam for at least one respective uplink channel or RS only, or a fourth TCI state that indicates a respective beam for a single downlink channel or RS, or a fifth TCI state that indicates a respective beam for a single uplink channel or RS, or a combination thereof.

Clause 111. The non-transitory computer-readable medium of any of clauses 106 to 110, wherein the indication of the UE capability is per cell.

Clause 112. The non-transitory computer-readable medium of clause 111, wherein the indication of the UE capability indicates support for a given RS type for a serving cell and a lack of support for the given RS type for a non-serving cell.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   transmitting to a network component an indication of capability of the UE to support one or more reference signal (RS) types as a quasi co-location (QCL) source RS for one or more transmission configuration indicator (TCI) states from a set of TCI states; and
   receiving a designation of a TCI state with a QCL source RS associated with one or more scheduled communications, the QCL source RS of the designated TCI state being based on the indication of the UE capability,
   wherein a first class of UE supports a set of RS types as QCL source RSs for the set of TCI states, and
   wherein the indication of the UE capability is based on the UE corresponding to a second class of UE that does not support at least one RS type from the set of RS types as a QCL source RS for the set of TCI states.

2. The method of claim 1, wherein the one or more scheduled communications comprises one or more downlink communications, one or more uplink communications, or a combination thereof.

3. The method of claim 2,
wherein the one or more scheduled communications comprise physical downlink control channel (PDCCH), physical downlink shared channel (PDSCH), physical uplink control channel (PUCCH), physical uplink shared channel (PUSCH), or a combination thereof, or
wherein the one or more scheduled communications include a synchronization signal block (SSB), a periodic, semi-persistent, or a periodic channel state information RS (CSI-RS) or positioning RS (PRS) or sounding reference signal (SRS), or a combination thereof.

4. The method of claim 1, wherein the indication of the UE capability indicates whether the UE supports as a respective QCL source RS type:
channel state information RS (CSI-RS) for beam management (BM), or
CSI-RS for non-BM, or
sounding reference signal (SRS) resource or resource set for BM, or
SRS or SRS resource set for non-BM,
SSB for BM or non-BM, or
an RS for positioning (RS-P), or
a combination thereof.

5. The method of claim 4, wherein the CSI-RS for non-BM comprises one or more of CSI-RS for tracking, CSI-RS for CSI acquisition, CSI-RS for interference management, CSI-RS for mobility, or a combination thereof.

6. The method of claim 4, wherein the SRS or SRS resource set for non-BM comprises antenna switching, codebook-based physical uplink shared channel (PUSCH), non-codebook-based PUSCH, or a combination thereof.

7. The method of claim 1, wherein the indication of the UE capability indicates whether link reciprocity between an uplink beam and a downlink beam is supported by the UE.

8. The method of claim 1, wherein the indication of the UE capability is per QCL type, per TCI state, per cell, or a combination thereof.

9. The method of claim 8, wherein the indication of the UE capability is per QCL type, and indicates one or more QCL types supported by the UE for each of the one or more RS types as QCL source RS.

10. The method of claim 9, wherein the one or more QCL type comprises QCL Type A, QCL Type B, QCL Type C, QCL Type D, or a combination thereof.

11. The method of claim 8, wherein the indication of the UE capability is per TCI state, and indicates one or more TCI states supported by the UE for each of the one or more RS types as QCL source RS.

12. The method of claim 11, wherein the one or more TCI states comprise:
a first TCI state that indicates a first common beam for at least one downlink channel or RS and at least one uplink channel or RS, or
a second TCI state that indicates a second common beam for at least one respective downlink channel or RS only, or
a third TCI state that indicates a third common beam for at least one respective uplink channel or RS only, or
a fourth TCI state that indicates a respective beam for a single downlink channel or RS, or
a fifth TCI state that indicates a respective beam for a single uplink channel or RS, or
a combination thereof.

13. The method of claim 8, wherein the indication of the UE capability is per cell.

14. The method of claim 13, wherein the indication of the UE capability indicates support for a given RS type for a serving cell and a lack of support for the given RS type for a non-serving cell.

15. A method of operating a network component, comprising:
receiving an indication of capability of a user equipment (UE) to support one or more reference signal (RS) types as a quasi co-location (QCL) source RS for one or more transmission configuration indicator (TCI) states from a set of TCI states;
determining a TCI state with a QCL source RS based on the indication of the UE capability; and
transmitting, to the UE, a designation of the TCI state with the QCL source RS associated with one or more scheduled communications,
wherein a first class of UE supports a set of RS types as QCL source RSs for the set of TCI states, and
wherein the indication of the UE capability is based on the UE corresponding to a second class of UE that does not support at least one RS type from the set of RS types as a QCL source RS for the set of TCI states.

16. The method of claim 15, wherein the one or more scheduled communications comprises one or more downlink communications, one or more uplink communications, or a combination thereof.

17. The method of claim 16,
wherein the one or more scheduled communications comprise physical downlink control channel (PDCCH), physical downlink shared channel (PDSCH), physical uplink control channel (PUCCH), physical uplink shared channel (PUSCH), or a combination thereof, or
wherein the one or more scheduled communications include a synchronization signal block (SSB), a periodic, semi-persistent, or a periodic channel state information RS (CSI-RS) or positioning RS (PRS) or sounding reference signal (SRS), or
a combination thereof.

18. The method of claim 15, wherein the indication of the UE capability indicates whether the UE supports as a respective QCL source RS type:
channel state information RS (CSI-RS) for beam management (BM), or
CSI-RS for non-BM, or
sounding reference signal (SRS) resource or resource set for BM, or
SRS or SRS resource set for non-BM, or
SSB for BM or non-BM, or
an RS for positioning (RS-P), or
or a combination thereof.

19. The method of claim 18, wherein the CSI-RS for non-BM comprises one or more of CSI-RS for tracking, CSI-RS for CSI acquisition, CSI-RS for interference management, CSI-RS for mobility, or a combination thereof.

20. The method of claim 18, wherein the SRS or SRS resource set for non-BM comprises antenna switching, codebook-based physical uplink shared channel (PUSCH), non-codebook-based PUSCH, or a combination thereof.

21. The method of claim 15, wherein the indication of the UE capability indicates whether link reciprocity between an uplink beam and a downlink beam is supported by the UE.

22. The method of claim 15, wherein the indication of the UE capability is per QCL type, per TCI state, per cell, or a combination thereof.

23. The method of claim 22, wherein the indication of the UE capability is per QCL type, and indicates one or more QCL types supported by the UE for each of the one or more RS types as QCL source RS.

24. The method of claim 23, wherein the one or more QCL type comprises QCL Type A, QCL Type B, QCL Type C, QCL Type D, or a combination thereof.

25. The method of claim 22, wherein the indication of the UE capability is per TCI state, and indicates one or more TCI states supported by the UE for each of the one or more RS types as QCL source RS.

26. The method of claim 25, wherein the one or more TCI states comprise:
a first TCI state that indicates a first common beam for at least one downlink channel or RS and at least one uplink channel or RS, or
a second TCI state that indicates a second common beam for at least one respective downlink channel or RS only, or
a third TCI state that indicates a third common beam for at least one respective uplink channel or RS only, or
a fourth TCI state that indicates a respective beam for a single downlink channel or RS, or
a fifth TCI state that indicates a respective beam for a single uplink channel or RS, or
a combination thereof.

27. The method of claim 22, wherein the indication of the UE capability is per cell.

28. The method of claim 27, wherein the indication of the UE capability indicates support for a given RS type for a serving cell and a lack of support for the given RS type for a non-serving cell.

29. A user equipment (UE), comprising:
a memory;
at least one transceiver; and
at least one processor communicatively coupled to the memory and the at least one transceiver, the at least one processor configured to:
transmit, to a network component via the at least one transceiver, an indication of capability of the UE to support one or more reference signal (RS) types as a quasi co-location (QCL) source RS for one or more transmission configuration indicator (TCI) states from a set of TCI states; and
receive, via the at least one transceiver, a designation of a TCI state with a QCL source RS associated with one or more scheduled communications, the QCL source RS of the designated TCI state being based on the indication of the UE capability,
wherein a first class of UE supports a set of RS types as QCL source RSs for the set of TCI states, and
wherein the indication of the UE capability is based on the UE corresponding to a second class of UE that does not support at least one RS type from the set of RS types as a QCL source RS for the set of TCI states.

30. A network component, comprising:
a memory;
at least one transceiver; and
at least one processor communicatively coupled to the memory and the at least one transceiver, the at least one processor configured to:
receive, via the at least one transceiver, an indication of capability of a user equipment (UE) to support one or more reference signal (RS) types as a quasi co-location (QCL) source RS for one or more transmission configuration indicator (TCI) states from a set of TCI states;
determine a TCI state with a QCL source RS based on the indication of the UE capability; and
transmit, via the at least one transceiver, to the UE, a designation of the TCI state with the QCL source RS associated with one or more scheduled communications,
wherein a first class of UE supports a set of RS types as QCL source RSs for the set of TCI states, and
wherein the indication of the UE capability is based on the UE corresponding to a second class of UE that does not support at least one RS type from the set of RS types as a QCL source RS for the set of TCI states.

\* \* \* \* \*